(12) United States Patent
Azam et al.

(10) Patent No.: US 6,935,580 B2
(45) Date of Patent: Aug. 30, 2005

(54) VALVE ASSEMBLY HAVING MULTIPLE RATE SHAPING CAPABILITIES AND FUEL INJECTOR USING SAME

(75) Inventors: Junru Azam, Normal, IL (US); Edward R. Gillis, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 108 days.

(21) Appl. No.: 10/361,351

(22) Filed: Feb. 10, 2003

(65) Prior Publication Data

US 2004/0159716 A1 Aug. 19, 2004

(51) Int. Cl.[7] .................. F02M 45/00; F02M 59/00; F02M 39/00; B05B 1/30
(52) U.S. Cl. ................. 239/533.5; 239/533.2; 239/533.3; 239/533.8; 239/585.1; 239/585.5
(58) Field of Search ................. 239/533.5, 533.2, 239/533.3, 533.8, 533.9, 585.1–585.5, 88–93; 251/129.15, 129.21, 127

(56) References Cited

U.S. PATENT DOCUMENTS

| | | |
|---|---|---|
| 4,971,290 A | 11/1990 | Dahlmann |
| 5,345,916 A | 9/1994 | Amann et al. |
| 5,890,471 A | 4/1999 | Nishimura |
| 5,893,350 A | 4/1999 | Timms |
| 5,934,560 A * | 8/1999 | Barry .................... 239/89 |
| 6,047,718 A | 4/2000 | Konsky et al. |
| 6,119,655 A | 9/2000 | Heinitz et al. |
| 6,167,869 B1 | 1/2001 | Martin et al. |
| 6,408,821 B1 | 6/2002 | Desai et al. |
| 6,439,201 B1 | 8/2002 | Gillis et al. |

OTHER PUBLICATIONS

Heavy Duty Diesel Engines—The Potential of Injection Rate Shaping for Optimizing Emissions and Fuel Consumption, presented by Messrs. Bernd Mahr, Manfred Dürnholz, Wilhelm Polach, and Hermann Grieshaber, Robert Bosch GmbH, Stuttgart, Germany, at the 21st International Engine Symposium, May 4–5, 2000, Vienna, Austria.

* cited by examiner

*Primary Examiner*—Davis Hwu
(74) *Attorney, Agent, or Firm*—Leill & McNeil (57) ABSTRACT

Engineers have determined that the performance of fuel injectors, including those used in common rail fuel injection systems, can be increased, and undesirable emissions reduced, by controlling the mass flow rate of fuel injected into a combustion chamber during an injection event. While a number of fuel injectors have been developed that have limited rate shaping capabilities, the ability to produce some front end rate shapes has not been possible. In an effort to increase rate shaping capabilities, the present invention includes a valve assembly having at least one valve member that is movable between a plurality of positions to control fluid communication between a number of fluid inlets and outlets.

20 Claims, 5 Drawing Sheets

Fig_4a_

Fig_4b_

Fig_5a_

Fig_5b_

VALVE ASSEMBLY HAVING MULTIPLE RATE SHAPING CAPABILITIES AND FUEL INJECTOR USING SAME

TECHNICAL FIELD

This invention relates generally to valve assemblies, and more particularly to rate shaping valve assemblies for fuel injectors.

BACKGROUND

Electronically controlled fuel injection systems are becoming more widespread for use with diesel engines. One example of such a system is the amplifier piston common rail system (APCRS) illustrated in the paper "Heavy Duty Diesel Engines—The Potential of Injection Rate Shaping for Optimizing Emissions and Fuel Consumption", presented by Messrs. Bernd Mahr, Manfred Durnholz, Wilhelm Polach, and Hermann Grieshaber; Robert Bosch GmbH, Stuttgart, Germany, at the $21^{st}$ International Engine Symposium, May 4–5, 2000, Vienna, Austria. In the Bosch fuel injection system, a controlled leakage strategy is utilized to control opening and closing of the needle. For instance, for pre-injection and the first portion of a main injection having a boot rate trace, fuel is directed along a by-pass route. After the main injection has begun, a pressure intensifier piston is activated for the required pressure controlled injection. While this system shows promise, there is still room for improvement.

Recently, engineers have determined that the performance of fuel injectors, including those used in common rail fuel injection systems, can be increased, and undesirable emissions reduced, by controlling the mass flow rate of fuel injected into a combustion chamber during an injection event. It is also believed that the ability to front end rate shape an injection event can further reduce emissions while increasing fuel injector performance. While a number of fuel injectors have been developed that have limited rate shaping capabilities, the ability to produce some front end rate shapes has not been possible. Therefore, a fuel injector having a broader range of front end rate shaping capabilities would allow greater flexibility for further reduction of undesirable emissions while allowing for improved fuel injector performance.

The present invention is directed to overcoming one or more of the problems as set forth above.

SUMMARY OF THE INVENTION

In one aspect of the present invention, a valve assembly includes a valve body that defines a first inlet, a second inlet, a first outlet and a second outlet. An electrical actuator is attached to the valve body. At least one valve member is at least partially positioned in the valve body and is operably coupled to the electrical actuator. The at least one valve member is movable between a first position, a second position and a third position. The first inlet is fluidly connected to the first outlet via a relatively restricted flow area when the at least one valve member is in the first position. The first inlet is fluidly connected to the first outlet via a relatively unrestricted flow area when the at least one valve member is in at least one of the second position and the third position. The second inlet is fluidly connected to the second outlet when the at least one valve member is in at least one of the first position, the second position and the third position. The second inlet is fluidly closed to the second outlet when the at least one valve member is in an other of the first position, the second position and the third position.

In another aspect of the present invention, a fuel injection system includes an injector body that defines at least one nozzle supply passage that is fluidly connected to a nozzle chamber, and a needle control passage that is fluidly connected to a needle control chamber. An electrical actuator is attached to the injector body. At least one valve member is positioned in the injector body and is operably coupled to the electrical actuator. The at least one valve member is movable between a first position, a second position and a third position. The at least one nozzle supply passage has a relatively restricted flow area when the at least one valve member is in the first position. The at least one nozzle supply passage has a relatively unrestricted flow area when the at least one valve member is in at least one of the second position and the third position. The needle control passage is open when the at least one valve member is in at least one of the first position, the second position and the third position. The needle control passage is closed when the at least one valve member is in an other of the first position, the second position and the third position.

In yet another aspect of the present invention, a method of injecting fuel includes a step of relieving pressure on a closing hydraulic surface of a needle valve member at least in part by energizing an electrical actuator with current above a first threshold level. Fuel is then directed to a nozzle outlet via a restricted passage and an unrestricted passage at least in part by energizing the electrical actuator with a higher current that is above a second threshold level.

DETAILED DESCRIPTION

Figure 1:
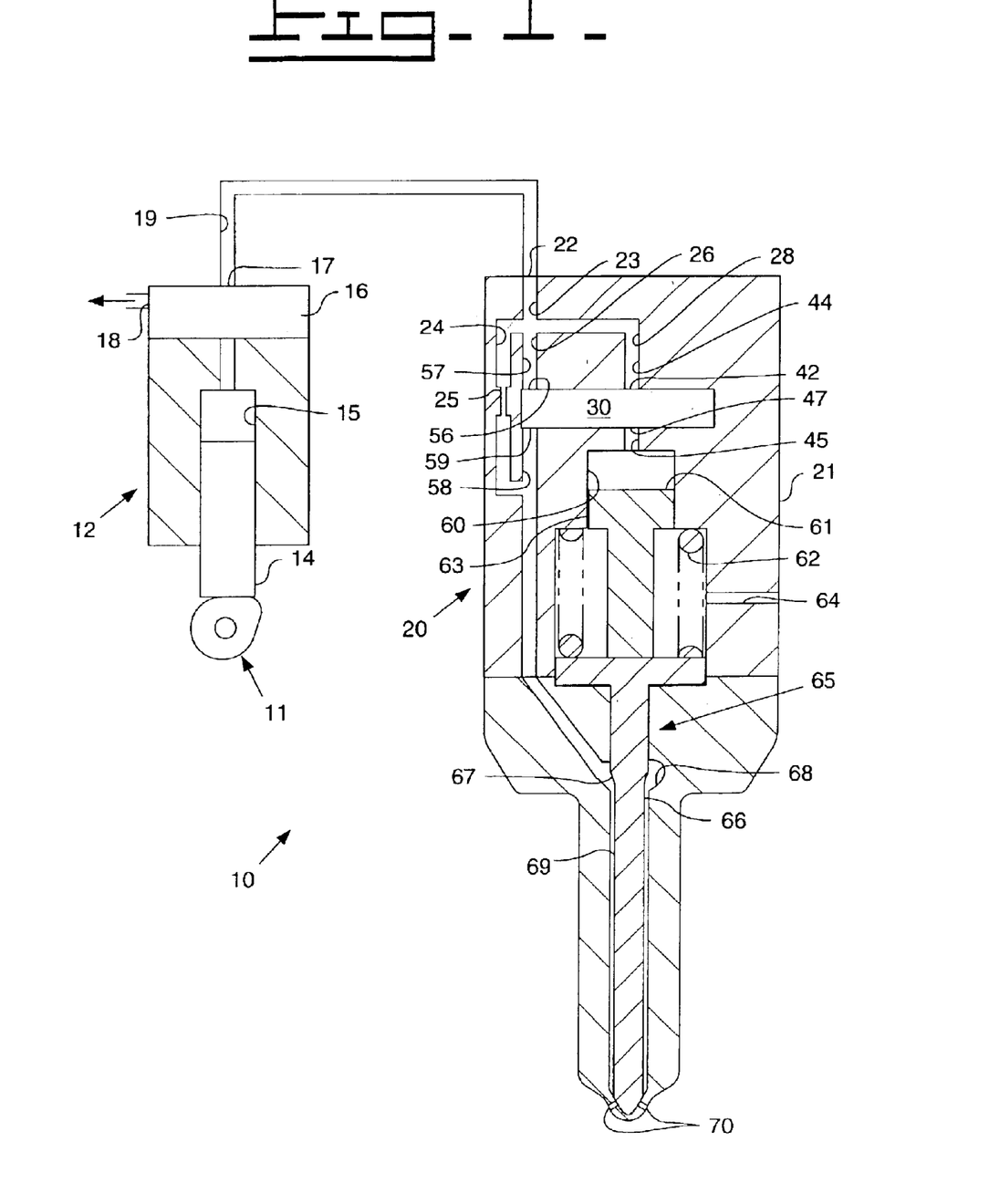
FIG. 1 is a sectioned diagrammatic representation of a fuel injection system according to the present invention.

Referring now to FIG. 1, there is illustrated a fuel injection system 10 that includes a fuel pressurizer that provides a reciprocating plunger 14. Reciprocating plunger 14 defines a portion of a fuel pressurization chamber 15. As illustrated in FIG. 1, the fuel pressurizer is preferably a unit pump 12 that supplies pressurized fuel to one or more fuel injectors 20 and is separated from the one or more fuel injectors 20. Unit pump 12 includes a plunger 14 that is moved to reciprocate between an advanced position and a retracted position by the rotation of a cam 11. Unit pump 12 preferably includes a conventional electronically controlled spill valve 16 which typically has two positions. When spill valve 16 is in its first, open position, low pressure fuel is spilled from a fuel pressurization chamber 15 to a pump inlet/spill port 18 for recirculation. When plunger 14 is undergoing its pumping stroke and spill valve 16 is in its second, closed position, fuel in fuel pressurization chamber 15 is pressurized to injection levels and displaced toward a nozzle outlet 70 of fuel injector 20 via a pump outlet 17 and a fuel supply line 19. While the fuel pressurizer has been illustrated as a unit pump 12 that is separate from the one or more fuel injectors 20, it should be appreciated that it could instead be a pumping unit that is positioned inside each fuel injector. In this case, the fuel injectors could be either hydraulically or mechanically actuated. Further, while the fuel pressurizer preferably includes a plunger that can increase pressure during the injection event to allow injection events having ramp shaped front ends, the present invention could also be used with a common rail fuel injection system. However, it should be appreciated that greater rate shaping flexibility can be achieved when the present invention is utilized with a fuel pressurizer that can increase the pressure of fuel being injected during the injection event, such as a fuel pressurizer including a plunger, as illustrated.

Returning to FIG. 1, fuel injector 20 provides an injector body 21 that defines a fuel inlet 22. In addition, injector body 21 preferably defines a plurality of fuel passages, including at least one nozzle supply passage, a fuel passage 23 and a needle control passage 28. As illustrated, the at least one nozzle supply passage includes a restricted nozzle supply passage 24 and an unrestricted nozzle supply passage 26. Restricted nozzle supply passage 24 includes a flow restriction orifice 25 and fluidly connects fuel inlet 22 to a nozzle chamber 68. Unrestricted nozzle supply passage 26 has an upper portion 57 separated from a lower portion 58 by a rate shaping valve assembly 30. Depending upon the position of rate shaping valve assembly 30, nozzle chamber 68 is either fluidly connected to fuel inlet 22 via a relatively restricted flow path, including restricted nozzle supply passage 24 alone, or via a relatively unrestricted flow path, including both restricted nozzle supply passage 24 and unrestricted nozzle supply passage 26. Needle control passage 28 has an upper portion 44 that is separated from a lower portion 45 by valve assembly 30 and can fluidly connect fuel inlet 22 to a needle control chamber 60 depending upon the position of valve assembly 30. As illustrated in FIG. 1, a first end of restricted nozzle supply passage 24 and a first end of unrestricted nozzle supply passage 26 are both fluidly connected to fuel passage 23. In addition, a first end of needle control passage 28 is also fluidly connected to fuel passage 23.

A direct control needle valve 65 is positioned in injector body 21 and includes a piston portion 63 and a needle valve member 66. Needle valve member 66 is movable between a biased, closed position and an open position, and is biased toward its closed position by a biasing spring 62. Piston portion 63 includes a closing hydraulic surface 61 that is exposed to fluid pressure in needle control chamber 60 while needle valve member 66 includes an opening hydraulic surface 67 that is exposed to fluid pressure in nozzle chamber 68. When a valve opening pressure is reached within nozzle chamber 68, needle valve member 66 can be moved to its open position. Recall, however, that nozzle chamber 68 can be open to fuel inlet 22 via only restricted nozzle supply passage 24. Thus, it should be appreciated that flow restriction orifice 25 should be large enough that a valve opening pressure can be attained, and maintained, in nozzle chamber 68 when nozzle chamber 68 is open to fuel inlet 22 via only restricted nozzle supply passage 24. In other words, flow restriction orifice 25 should be sufficiently large to prevent chatter of needle valve member 66 when needle valve member 66 is in its open position and nozzle chamber 68 is open to fuel inlet 22 via only restricted nozzle supply passage 24. However, it should be further appreciated that flow restriction orifice 25 should be sufficiently small to allow restricted nozzle supply passage 24 to function as a relatively restricted flow passage. In addition, a drain passage 64, defined by injector body 21, is provided to allow any fuel that has migrated past the piston or needle portions of direct control needle valve 65 to be evacuated from fuel injector 20.

Figure 2:
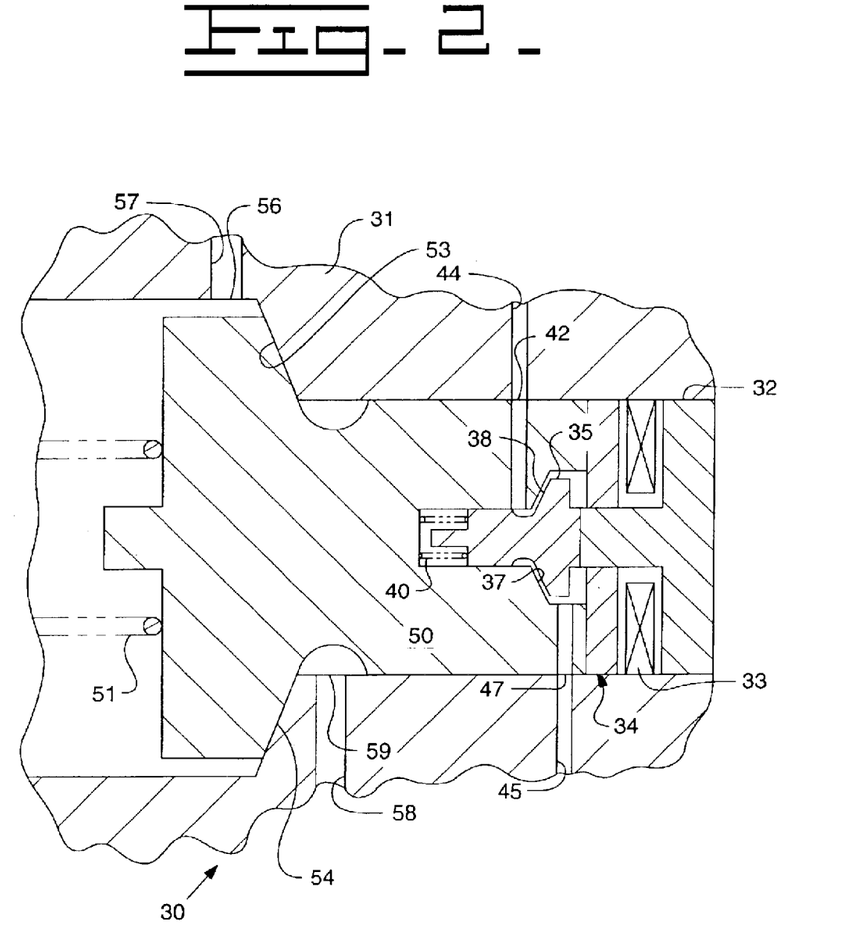
FIG. 2 is a front sectioned diagrammatic representation of the valve assembly of the fuel injector of FIG. 1.

Referring in addition to FIG. 2, rate shaping valve assembly 30 is illustrated in greater detail. Valve assembly 30 provides a valve body 31, which is a portion of injector body 21, that preferably defines a needle control inlet 42, a nozzle supply fuel inlet 56, a needle control outlet 47 and a nozzle supply outlet 59. As illustrated, needle control inlet 42 and nozzle supply fuel inlet 56 are both fluidly connected to a common fluid source, unit pump 12, via fuel passage 23 and fuel inlet 22. Valve assembly 30 includes at least one valve member operably coupled to an electrical actuator 34, which preferably includes a needle control valve member 35 and a rate shaping valve member 50, as illustrated in FIG. 2. Electrical actuator 34 is attached to injector body 21 and is preferably a solenoid that includes a coil 33 and an armature 32 and is energizable to a first, low current position and a second, higher current position. However, it should be appreciated that another suitable actuation device could instead be utilized, such as a piezoelectric actuator. In addition to the low current and high current positions, which can be thought of as low current pull and high current pull positions, solenoid 34 can also be energized to a low current hold position and a high current hold position. Thus, the low current pull level can be thought of as the amount of current above a first threshold level that is needed to move needle control valve member 35 from its biased position to its unbiased position, while the low current hold level is a lesser amount of current that is needed to hold needle control valve member 35 in its unbiased position. Similarly, the second, high current pull level is the amount of current above a second, higher threshold level that is needed for solenoid 34 to move rate shaping valve member 50 from its biased position to its unbiased position, while the high current hold level is the amount of current needed for rate shaping valve member 50 to be maintained in its unbiased position.

Returning to rate shaping valve assembly 30, needle control valve member 35 is operably coupled to move with armature 32 and is movable within injector body 21 between a biased, open position and a closed position. Needle control valve member 35 is biased toward its open position by a biasing spring 40 that is compressed between rate shaping valve member 50 and needle control valve member 35. Rate shaping valve member 50 preferably defines a portion of needle control passage 28 and is movable between a biased, closed position and an open position. Rate shaping valve member 50 is biased toward its open position by a biasing spring 51 that is compressed between injector body 21 and rate shaping valve member 50. It should be appreciated that if rate shaping valve assembly 30 is configured as illustrated, the force exerted by armature 32 and needle control valve member 35 when solenoid coil 33 is energized by an amount of current below the second threshold level should not be sufficient to overcome the force of biasing spring 51, which preferably biases rate shaping valve member 50 toward its closed position. In other words, biasing spring 51 should have a higher preload to produce a stronger biasing force than biasing spring 40 when rate shaping valve assembly 30 is configured as illustrated, such that a greater force is required to move rate shaping valve member 50 toward its advanced position than is needed to move needle control valve member 35 toward its advanced position.

When solenoid coil 33 is de-energized, valve assembly 30 is in a first position. It should be appreciated that for the purposes of the present invention, solenoid 34 can be thought to be in its de-energized state when it is receiving no current or when it is receiving an amount of current below the first threshold level which is an insufficient amount of current to move needle control valve member 35 from its biased position. When valve assembly 30 is in the first position, needle control valve member 35 is in its biased open position away from a valve stop included on rate shaping valve member 50. As illustrated, the valve stop is preferably a conical valve seat 37. Needle control inlet 42 is thus fluidly connected to needle control outlet 47 to open needle control passage upper portion 44 to needle control passage lower portion 45. Therefore, pressurized fuel entering fuel injector 20 via fuel inlet 22 can act on closing hydraulic surface 61 in needle control chamber 60. In addition, when valve assembly 30 is in the first position, rate shaping valve member 50 is in its biased, closed position. In this position, a valve seat 53 defined by valve body 31 is closed by a valve surface 54 provided by rate shaping valve member 50. Nozzle supply fuel inlet 56 is therefore blocked from fluid communication with nozzle supply outlet 59, thus preventing fluid communication between unrestricted nozzle supply passage upper portion 57 and unrestricted nozzle supply passage lower portion 58. Therefore, fuel inlet 22 is fluidly connected to nozzle chamber 68 via only restricted nozzle supply passage 24, a relatively restricted flow area flow passage. However, it should be appreciated that because needle control chamber 60 is fluidly connected to fuel inlet 22 via needle control passage 28 when solenoid coil 33 is de-energized or receiving an amount of current below the first threshold level, nozzle outlet 70 remains closed at this time.

When solenoid coil 33 is energized by a current level above a first threshold value but below a second threshold value to its low current pull position, valve assembly 30 is moved to a second position. In this position, needle control valve member 35 is pushed toward its closed position by armature 32. However, because biasing spring 51 preferably has a higher preload than biasing spring 40, rate shaping valve member 50 will remain in its biased, closed position at this time. When needle control valve member 35 is in its closed position, a valve surface 38 provided by needle control valve member 35 contacts, and therefore closes, valve seat 37. Thus, that portion of needle control passage 28 that is defined by rate shaping valve member 50 is closed when valve surface 38 closes valve seat 37. Needle control inlet 42 is thus blocked from needle control outlet 47 to prevent fluid communication between needle control passage upper portion 44 and needle control passage lower portion 45, thus blocking fluid communication between fuel inlet 22 and needle control chamber 60. Therefore, pressure acting on closing hydraulic surface 61 is relieved when solenoid coil 33 is energized with an amount of current above the first threshold level. Further, because rate shaping valve member 50 is still in its biased, closed position, nozzle chamber 68 is still fluidly connected to fuel inlet 22 via a relatively restricted flow area including only restricted nozzle supply passage 24.

When solenoid coil 33 is energized by a current level above the second threshold to a high current pull position, corresponding to a third position of valve assembly 30, rate shaping valve member 50 is moved to its open position by armature 32 and needle control valve member 35. In this position, valve seat 53 is opened by rate shaping valve member 50 to allow fluid communication between nozzle supply fuel inlet 56 and nozzle supply outlet 59, thus fluidly connecting unrestricted nozzle supply passage upper portion 57 to unrestricted nozzle supply passage lower portion 58. Therefore, when valve assembly 30 is in its third position, fuel inlet 22 is fluidly connected to nozzle chamber 68 via a relatively unrestricted flow area including both restricted nozzle supply passage 24 and unrestricted nozzle supply passage 26. In other words, fuel is directed to nozzle outlet 70 by both a relatively restricted passage, restricted nozzle supply passage 24, and a relatively unrestricted passage, unrestricted nozzle supply passage 26, when solenoid coil 33 is energized with a higher current that is above the second threshold level. Thus, for certain rate shaping applications, as illustrated below, it might be preferable to direct fuel to nozzle outlet 70 via only restricted nozzle supply passage 24 for a predetermined duration of time, and then to increase the current being supplied to solenoid coil 33 to a level above the second threshold level to open nozzle outlet 70 to unrestricted nozzle supply passage 26.

INDUSTRIAL APPLICABILITY

Referring now to FIGS. 1 and 2, just prior to the desired start of an injection event, needle valve member 66 is in its downward, closed position blocking nozzle outlet 70 from nozzle chamber 68. Valve assembly 30 is in its first position such that needle control valve member 35 is in its biased, open position fluidly connecting needle control chamber 60 to fuel inlet 22 and rate shaping valve member 50 is in its biased, closed position blocking fluid communication between nozzle chamber 68 and fuel inlet 22 via unrestricted nozzle supply passage 26. Fuel inlet 22 is open to nozzle chamber 68 via restricted nozzle supply passage 24. Just prior to the desired start of an injection event, solenoid coil 33 is energized. The amount of current supplied to solenoid coil 33, and the timing of energization of solenoid coil 33, are dependent upon the desired rate trace of the injection event. Thus, the present invention will be described creating injection events having a number of different rate shapes. However, it should be appreciated that the following description is not intended to limit the present invention to only those rate shapes disclosed. Injection events having the disclosed rate shapes have been selected for illustrative purposes only.

Figure 3A:
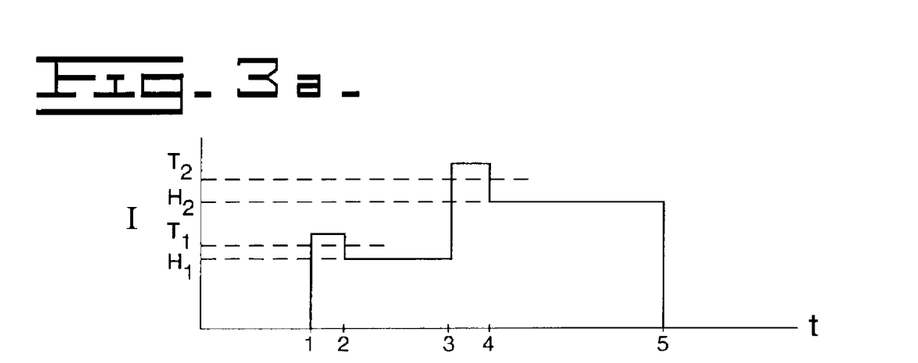
FIGS. 3a–b are graphical representations of current level and mass flow rate versus time for a boot injection according to the present invention.
Figure 3B:
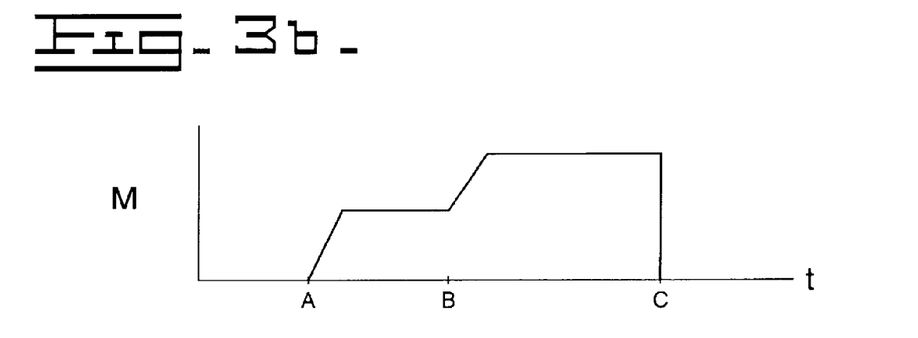

Referring in addition to FIGS. 3*a*–*b*, the present invention will be described for creation of an injection event having a boot shaped rate trace. Prior to the desired start of an injection event, pump inlet/spill port 18 closes and rotation of cam 11 causes plunger 14 to be moved toward its advanced position, thus beginning the pressurization of fuel within fuel pressurization chamber 15. Just prior to the desired start of the injection event, solenoid coil 33 is supplied with an amount of current above the first threshold level (Time I, FIG. 3*a*). Needle control valve member 35 is then pushed to its closed position by armature 32. With high pressure no longer acting on closing hydraulic surface 61 in needle control chamber 60, the high pressure acting on opening hydraulic surface 67 is sufficient to move needle valve member 66 toward its open position (Time A, FIG. 3*b*). Once needle control valve member 35 is moved to its closed position, current to solenoid coil 33 is reduced to a low current hold level that is sufficient to maintain valve member 35 in this position (Time 2, FIG. 3*a*). It should be appreciated that because pump 12 has not yet raised the pressure of fuel being supplied to injector 20 to maximum injection levels prior to the start of the injection event, pressure of fuel being supplied to injector 20, and therefore the pressure of fuel being injected by injector 20, will continue to rise.

When it is desired to ramp up to higher injection levels, solenoid coil 33 is supplied with a higher amount of current above the second threshold level (Time 3, FIG. 3a). Rate shaping valve member 50 is thus moved toward its open position (Time B, FIG. 3b) and pressurized fuel can now flow through unrestricted nozzle supply passage 26 into nozzle chamber 68. After rate shaping valve member 50 is moved to its open position, current to solenoid 32 is reduced to a level below the second threshold, but above the first threshold, to a high current hold level that is sufficient to maintain valve members 35 and 50 in their respective closed and opened positions (Time 4, FIG. 3a). It should be appreciated that the pressure of fuel being injected by injector 20 could continue to rise once rate shaping valve member 50 is moved to its open position if pump 12 had not raised the pressure of fuel being supplied to fuel injector 20 to maximum injection levels prior to the increase in current to solenoid coil 33.

When the desired amount of fuel has been injected, current supplied to solenoid coil 33 is ended (Time 5, FIG. 3a). Needle control valve member 35 is returned to its biased, open position under the influence of biasing spring 40 while rate shaping valve member 50 is returned to its biased, closed position under the influence of biasing spring 51. Needle control chamber 60 is once again fluidly connected to fuel inlet 22 via needle control passage 28, thus re-exposing closing hydraulic surface 61 to high pressure. With pressurized fuel acting on closing hydraulic surface 61, needle valve member 66 is returned to its downward, closed position to end the injection event (Time C, FIG. 3b). At the same time, with rate shaping valve member 50 once again in its closed position, unrestricted nozzle supply passage 26 is once again blocked such that nozzle chamber 68 is fluidly connected to fuel inlet 22 via only restricted nozzle supply passage 24. As the various components of fuel injector 20 reset themselves for the next injection event, cam 11 continues to rotate, and plunger 14 is returned to its downward position. As plunger 14 retracts, fuel is drawn into fuel pressurization chamber 15 via pump inlet/spill port 18.

Figure 4A:
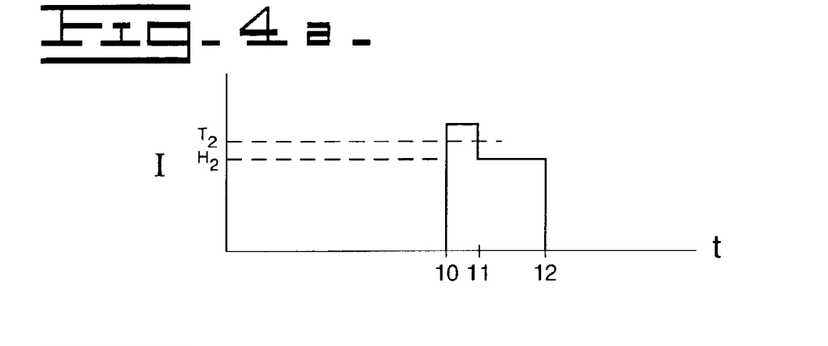
FIGS. 4a–b are graphical representations of current level and mass flow rate versus time for a square injection according to another aspect of the present invention.
Figure 4B:
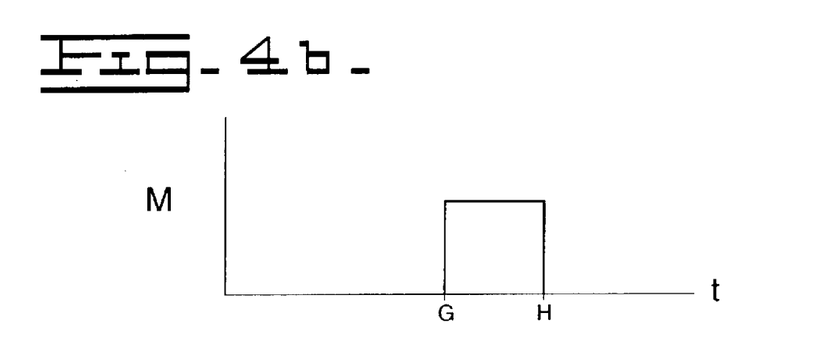

Referring now to FIGS. 4a–b, the present invention will be described for an injection event having a square rate trace. Pump inlet/spill port 18 is closed and plunger 14 begins to advance with rotation of cam 11 to pressurize fuel within fuel pressurization chamber 15. It should be appreciated that for the front end of the injection event to have a square rate shape, as opposed to a ramp rate shape, fuel being supplied to fuel inlet 22 should be at or near the maximum desired injection pressures for the injection event before nozzle outlet 70 is opened. Thus, solenoid coil 33 is preferably not energized until pump 12 has pressurized the fuel to about the desired injection pressure. Just prior to the desired start of the injection event, solenoid coil 33 is supplied with a high pull current amount, which is above the second threshold current level (Time 10, FIG. 4a). Needle control valve member 35 is moved to its closed position by armature 32 to close needle control passage upper portion 44 from needle control passage lower portion 45, ending fuel flow from fuel inlet 22 to needle control chamber 60. At the same time, rate shaping valve member 50 is moved to its open position by needle control valve member 35 to open unrestricted nozzle supply passage upper portion 57 to unrestricted nozzle supply passage lower portion 58 thus opening nozzle chamber 68 to fuel inlet 22 via unrestricted nozzle supply passage 26. With closing hydraulic surface 61 no longer exposed to high pressure within needle control chamber 60, needle valve member 66 can be lifted to its upward, open position as a result of the high pressure fuel acting on opening hydraulic surface 67 in nozzle chamber 68 (Time G, FIG. 4b). In addition, once valve members 35 and 50 have been moved to their respective closed and open positions, current to solenoid coil 33 is reduced to a high current hold level that is sufficient to maintain the valve members in their respective positions (Time 11, FIG. 4a)

When the desired amount of fuel has been injected by fuel injector 20, solenoid coil 33 is de-energized (Time 12, FIG. 4a). Needle control valve member 35 is returned to its biased, open position under the influence of biasing spring 40 while rate shaping valve member 50 is returned to its biased, closed position under the influence of biasing spring 51. Needle control chamber 60 is once again fluidly connected to fuel inlet 22 via needle control passage 28, thus re-exposing closing hydraulic surface 61 to high pressure. With pressurized fuel acting on closing hydraulic surface 61, needle valve member 66 is returned to its downward, closed position to end the injection event (Time H, FIG. 4b). At the same time, with rate shaping valve member 50 once again in its closed position, unrestricted nozzle supply passage 26 is once again blocked such that nozzle chamber 68 is fluidly connected to fuel inlet 22 via only restricted nozzle supply passage 24. As the various components of fuel injector 20 reset themselves for a subsequent injection event, pump inlet/spill port 18 is opened. As cam 11 continues rotating, plunger 14 ends its advancing movement and begins to retract. As plunger 14 retracts, fresh fuel is drawn into fuel pressurization chamber 15 via pump inlet/spill port 18 for the next injection event.

Figure 5A:
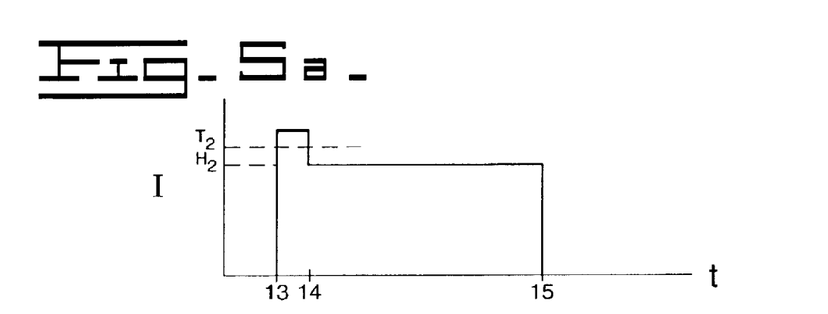
FIGS. 5a–b are graphical representations of current level and mass flow rate versus time for a ramp or triangle injection according to yet another aspect of the present invention.
Figure 5B:
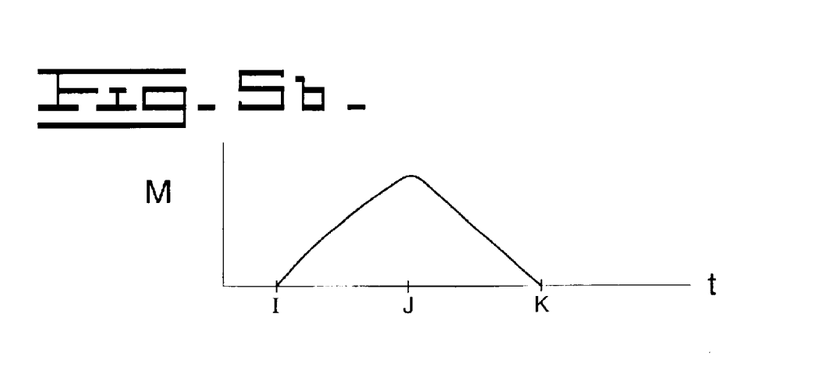

Referring now to FIGS. 5a–b, the present invention will be described for an injection event having a triangle rate trace. Whereas the previous injection rate trace was generated by energizing solenoid coil 33 once unit pump 12 built up fuel pressure to about the maximum desired injection level, for a triangle rate trace, solenoid coil 33 is energized before pump 12 has raised fuel in fuel pressurization chamber 15 to the maximum desired injection pressure. Thus, just prior to the desired start of an injection event, and prior to maximum injection pressure being reached by pump 12, solenoid coil 33 is supplied with an amount of current above the second threshold level (Time 13, FIG. 5a). Needle control valve member 35 is thus moved to its closed position blocking fluid communication between needle control chamber 60 and fuel inlet 22, while rate shaping valve member 50 is moved to its open position fluidly connecting nozzle chamber 68 to fuel inlet 22 via unrestricted nozzle supply passage 26. With high pressure no longer acting on closing hydraulic surface 61 in needle control chamber 60, needle valve member 66 is moved away from its closed position once a valve opening pressure is reached in nozzle chamber 68 to allow the commencement of fuel spray from nozzle outlet 70 (Time I, FIG. 5b). As pump 12 increases the pressure of fuel being supplied to injector 20, the mass flow rate of fuel being injected via nozzle outlet 70 continues to rise. Further, once valve members 35 and 50 have been moved to their respective closed and opened positions, current to solenoid coil 33 is reduced to a high current hold level that is sufficient to maintain valve members 35 and 50 in their respective opened and closed positions (Time 14, FIG. 5a).

Prior to the desired end of the injection event, pump 12 ceases pressurizing fuel and dumps excess fuel via pump inlet/spill port 18. As pump 12 ends pressurization, fuel supplied to fuel inlet 22 will begin to decrease in pressure, resulting in a decrease in the pressure within nozzle chamber 68. Thus, with fuel pressure acting on opening hydraulic surface 67 decreasing, needle valve member 66 will be moved toward its closed position by biasing spring 62 (Time J, FIG. 5*b*). However, it should be appreciated that needle valve member 66 will not be returned to its closed position so long as fuel pressure within nozzle chamber 68 remains above the valve closing pressure. After needle valve member has closed, solenoid coil 33 is de-energized (Time 15, FIG. 5*a*) and needle control valve member 35 is returned to its biased, open position by biasing spring 40. Needle control chamber 60 is once again fluidly connected to fuel inlet 22 via needle control passage 28. With high pressure now acting on closing hydraulic surface 61 in needle control chamber 60, fuel pressure acting on opening hydraulic surface 67 is no longer sufficient to maintain needle valve member 66 in an open position. Thus, needle valve member 66 is returned to its closed position to end the injection event (Time K, FIG. 5*b*).

Figure 6A:
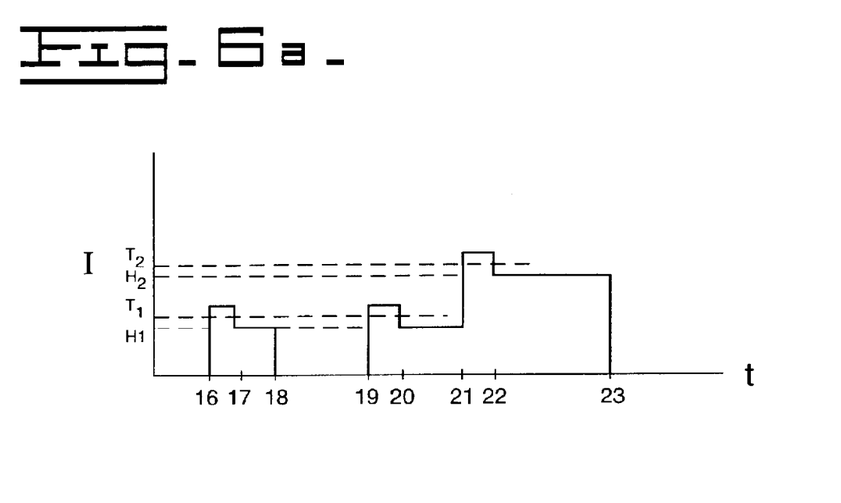
FIGS. 6a–b are graphical representations of current level and mass flow rate versus time for a split injection having a boot according to still another aspect of the present invention.
Figure 6B:
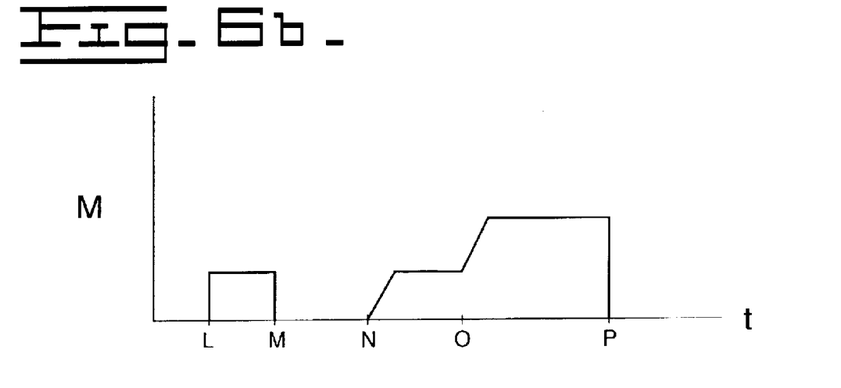

Referring now to FIGS. 6*a*–*b*, the present invention will be described for a split injection event. As illustrated, the injection event will include a small, square pilot injection with a boot shaped main injection. Prior to an injection event, pump inlet/spill port 18 is closed. Rotation of cam 11 causes plunger 14 to advance and begin pressurization of fuel within fuel pressurization chamber 15. Just prior to the desired start of the pilot injection event, solenoid coil 33 is supplied with an amount of current above the first threshold level (Time 16, FIG. 6*a*). Needle control valve member 35 is then pushed to its closed position by armature 32. With high pressure no longer acting on closing hydraulic surface 61 in needle control chamber 60, the high pressure acting on opening hydraulic surface 67 is sufficient to move needle valve member 66 toward its open position (Time L, FIG. 6*b*). In addition, once needle control valve member 35 has been moved to its closed position, current to solenoid coil 33 is reduced to a low current hold level (Time 17, FIG. 6*a*). When the desired amount of fuel has been injected for the pilot injection, solenoid coil 33 is de-energized (Time 18, FIG. 6*a*) and needle control valve member 35 is returned to its open position by biasing spring 40. With needle control chamber 60 re-connected to fuel inlet 22, the high pressure acting on closing hydraulic surface 61 is sufficient to move needle valve member 66 to its downward position to end the pilot injection (Time M, FIG. 6*b*).

When it is desired to begin the main injection event, solenoid coil 33 is re-energized with an amount of current above the first threshold level but below the second threshold level (Time 19, FIG. 6*a*) and needle control valve member 35 is returned to its closed position by armature 32. Needle control passage 28 is once again closed by needle control valve member 35 and needle control chamber 60 is again blocked from fuel inlet 22. With high pressure no longer acting on closing hydraulic surface 61, the fuel pressure acting on opening hydraulic surface 67 is sufficient to lift needle valve member 66 toward its open position (Time N, FIG. 6*b*). Thus, it should be appreciated that a split injection can be produced by re-energizing solenoid coil 33 with a current above the first threshold level after nozzle outlet 70 has been closed for the pilot injection event. Once needle control valve member 35 has been moved to its closed position, current to solenoid coil 33 is reduced to the first hold level (Time 20, FIG. 6*a*). When it is desired to increase to higher injection levels, current to solenoid coil 33 is increased above the second threshold level (Time 21, FIG. 6*a*). Rate shaping valve member 50 is then moved toward its open position (Time O, FIG. 6*b*). Pressurized fuel can now flow through unrestricted nozzle supply passage 26 into nozzle chamber 68. Once again, when rate shaping valve member 50 is moved to its open position, current to solenoid coil 33 is reduced to a high current hold level (Time 22, FIG. 6*a*).

When the desired amount of fuel has been injected, current is ended to solenoid coil 33 (Time 23, FIG. 6*a*). Needle control valve member 35 is returned to its biased, open position under the influence of biasing spring 40 while rate shaping valve member 50 is returned to its biased, closed position under the influence of biasing spring 51. Needle control chamber 60 is once again fluidly connected to fuel inlet 22 via needle control passage 28, thus re-exposing closing hydraulic surface 61 to high pressure. With pressurized fuel acting on closing hydraulic surface 61, needle valve member 66 is returned to its downward, closed position to end the injection event (Time P, FIG. 6*b*). At the same time, with rate shaping valve member 50 once again in its closed position, unrestricted nozzle supply passage 26 is once again blocked such that nozzle chamber 68 is fluidly connected to fuel inlet 22 via only restricted nozzle supply passage 24. As the various components of fuel injector 20 reset themselves for the next injection event, pump inlet/spill port 18 is reopened. Plunger 14 ends its advancing movement and begins to retract with the continued rotation of cam 11. The retracting movement of plunger 14 draws fresh fuel into fuel pressurization chamber 15 for the next injection event.

It should be appreciated that various modifications could be made to the embodiment of the present invention disclosed herein. For instance, while valve assembly 30 has been illustrated including a needle control valve member 35 and a rate shaping valve member 50, both of which are poppet valves, it should be appreciated that various other valve members could be substituted. For example, one or both of these valve members could be replaced by a spool valve member or a ball valve member. Alternatively, valve assembly 30 could include a single valve member in place of valve members 35 and 50. In addition, while needle control valve member 35 has been illustrated separating needle control chamber 60 from a source of high pressure, it should be appreciated that needle control valve member 35 could instead separate needle control chamber 60 from a source of low pressure. In this instance, needle control valve member 35 would move to a position opening needle control chamber 60 to the low pressure source just prior to the desired start of an injection event. Additionally, while the present invention has been illustrated utilizing pressurized fuel to actuate needle valve member 66, it should be appreciated that other suitable actuation fluids, such as engine lubricating oil, could be utilized. Thus, it should be appreciated that for this alternative restricted nozzle supply passage 24 and unrestricted nozzle supply passage 26 could be fluidly connected to fuel inlet 22, while needle control passage 28 is fluidly connected to a separate fluid inlet.

Further, while restricted nozzle supply passage 24 has been illustrated as being defined by injector body 21, it should be appreciated that the flow restriction could instead be defined by rate shaping valve member 50 and injector body 21. For instance, rate shaping valve member 50 could define restricted nozzle supply passage 24 to open at valve seat 53. In a first position, valve surface 54 could be positioned slightly away from valve seat 53, such that a restricted flow path would exist around valve seat 53. In a second position, valve surface 54 could be further from valve seat 53 such that no flow restriction exists in the flow passage. In addition, restricted nozzle supply passage 24 could be defined completely by rate shaping valve member 50. In this instance, restricted nozzle supply passage 24 would be defined by rate shaping valve member 50 to be open to nozzle supply passage lower portion 58 regardless of whether rate shaping valve member 50 is in its open or closed position.

Although this invention is illustrated in the context of a hydraulically actuated unit pump fuel injection system, one skilled in the art will recognize that this invention is equally applicable to other fuel systems such as the amplifier piston common rail system (APCRS) illustrated in the paper "Heavy Duty Diesel Engines—The Potential of Injection Rate Shaping for Optimizing Emissions and Fuel Consumption", presented by Messrs. Bernd Mahr, Manfred Durnholz, Wilhelm Polach, and Hermann Grieshaber; Robert Bosch GmbH, Stuttgart, Germany, at the 21$^{st}$ International Engine Symposium, May 4–5, 2000, Vienna, Austria.

It should be understood that the above description is intended for illustrative purposes only, and is not intended to limit the scope of the present invention in any way. Thus, those skilled in the art will appreciate that other aspects, objects and advantages of this invention can be obtained from a study of the drawings, the disclosure and the appended claims.

What is claimed is:

1. A valve assembly comprising:
    a valve body defining a first inlet, a second inlet, a first outlet and a second outlet;
    an electrical actuator attached to said valve body;
    at least one valve member at least partially positioned in said valve body and being operably coupled to said electrical actuator, and being movable between a first position, a second position and a third position;
    said first inlet being fluidly connected to said first outlet via a relatively restricted flow area when said at least one valve member is in said first position;
    said first inlet being fluidly connected to said first outlet via a relatively unrestricted flow area when said at least one valve member is in at least one of said second position and said third position;
    said second inlet being fluidly connected to said second outlet when said at least one valve member is in at least one of said first position, said second position and said third position; and
    said second inlet being fluidly closed to said second outlet when said at least one valve member is in an other of said at least one of said first position, said second position and said third position.

2. The valve assembly of claim 1 wherein said first inlet and said second inlet are fluidly connected to a common fluid source.

3. The valve assembly of claim 1 wherein said at least one valve member includes a first valve member and a second valve member;
    one of said first valve member and said second valve member includes a conical valve seat and an other of said first valve member and said second valve member is in contact with said conical valve seat when said at least one valve member is in at least one of said first position, said second position and said third position.

4. The valve assembly of claim 3 wherein said electrical actuator is a solenoid that includes an armature; and
    one of said first valve member and said second valve member being operably coupled to move with said armature.

5. The valve assembly of claim 1 wherein said first position corresponds to a current level to said electrical actuator that is below a first threshold;
    said second position corresponds to a current level to said electrical actuator that is between said first threshold and a second threshold; and
    said third position corresponds to a current level to said electrical actuator that is above said second threshold.

6. A fuel injection system comprising:
    an injector body defining at least one nozzle supply passage fluidly connected to a nozzle chamber and a needle control passage fluidly connected to a needle control chamber;
    an electrical actuator attached to said injector body;
    at least one valve member positioned in said injector body and being operably coupled to said electrical actuator; and being movable between a first position, a second position and a third position;
    said at least one nozzle supply passage having a relatively restricted flow area when said at least one valve member is in said first position;
    said at least one nozzle supply passage having a relatively unrestricted flow area when said at least one valve member is in at least one of said second position and said third position;
    said needle control passage being open when said at least one valve member is in at least one of said first position, said second position and said third position; and
    said needle control passage being closed when said at least one valve member is in an other of said at least one of said first position, said second position and said third position.

7. The fuel injection system of claim 6 wherein said first position corresponds to a current level to said electrical actuator that is below a first threshold;
    said second position corresponds to a current level to said electrical actuator that is between said first threshold and a second threshold; and
    said third position corresponds to a current level to said electrical actuator that is above said second threshold.

8. The fuel injection system of claim 6 wherein said at least one valve member includes a rate shaping valve member that includes a valve stop and defines a portion of said needle control passage; and
    said at least one valve member includes a needle control valve member that closes said portion of said needle control passage when in contract with said valve stop.

9. The fuel injection system of claim 8 wherein said valve stop is a conical valve seat.

10. The fuel injection system of claim 8 wherein a first spring is compressed between said injector body and said rate shaping valve member; and
    a second spring is compressed between said rate shaping valve member and said needle control valve member.

11. The fuel injection system of claim 8 wherein said electrical actuator includes a solenoid having an armature; and
    said needle control valve member is operably coupled to move with said armature.

12. The fuel injection system of claim 6 wherein said at least one nozzle supply passage includes a passage defined by said injector body that includes said restricted flow area.

13. The fuel injection system of claim 6 wherein said injector body defines a fuel passage;
    a first end of said at least one nozzle supply passage is fluidly connected to said fuel passage; and a first end of said needle control passage is fluidly connected to said fuel passage.

14. The fuel injection system of claim 13 including a fuel pressurizer that includes a reciprocating plunger that defines a portion of a fuel pressurization chamber that is fluidly connected to an end of said fuel passage.

15. The fuel injection system of claim 14 wherein said fuel pressurizer is a unit pump that is separated from said injector body.

16. A method of injecting fuel with the fuel injection system of claim 6, comprising the steps of:
  relieving pressure on a closing hydraulic surface of a needle valve member at least in part by energizing the electrical actuator with current above a first threshold level;
  directing fuel to a nozzle outlet via the relatively restricted flow area and the relatively unrestricted flow area at least in part by energizing said electrical actuator with a higher current that is above a second threshold level.

17. The method of claim 16 including a step of closing the nozzle outlet at least in part by reducing current to the electrical actuator below the first threshold level.

18. The method of claim 17 including a step of producing a split injection at least in part by re-energizing said electrical actuator with a current above said first threshold level after said closing step.

19. The method of claim 16 wherein said directing step includes a step of opening an unrestricted passage, which includes the unrestricted flow area, after passing fuel to said nozzle outlet through said restricted passage, which includes the restricted flow area, for a predetermined duration of time.

20. The method of claim 16 wherein said directing step includes a step of displacing fuel toward said nozzle outlet at least in part by moving a plunger.

* * * * *